(12) United States Patent
Otsuka

(10) Patent No.: US 8,534,913 B2
(45) Date of Patent: Sep. 17, 2013

(54) TEMPERATURE DETECTOR, IMAGE FORMING DEVICE HAVING TEMPERATURE DETECTOR, AND CONTAMINATION DETECTION METHOD FOR TEMPERATURE DETECTOR

(75) Inventor: Yutaka Otsuka, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 749 days.

(21) Appl. No.: 12/795,398

(22) Filed: Jun. 7, 2010

(65) Prior Publication Data
US 2010/0309950 A1 Dec. 9, 2010

(30) Foreign Application Priority Data
Jun. 9, 2009 (JP) ................................. 2009-138141

(51) Int. Cl.
*G01N 25/00* (2006.01)
*G01J 5/00* (2006.01)
*G03G 15/20* (2006.01)

(52) U.S. Cl.
USPC ................ 374/121; 374/45; 399/69; 399/328

(58) Field of Classification Search
USPC .......................................... 374/121; 399/69
See application file for complete search history.

(56) References Cited

U.S. PATENT DOCUMENTS

| | | | | |
|---|---|---|---|---|
| 4,485,305 A | * | 11/1984 | Kuwano et al. | ............ 250/338.1 |
| RE34,507 E | * | 1/1994 | Egawa et al. | ................ 374/126 |
| 2008/0219722 A1 | * | 9/2008 | Sone et al. | .................... 399/328 |
| 2010/0073670 A1 | | 3/2010 | Furukawa et al. | |

FOREIGN PATENT DOCUMENTS

| | | | |
|---|---|---|---|
| JP | 2001-034109 A | | 2/2001 |
| JP | 2002-149003 | | 5/2002 |
| JP | 2002149003 A | * | 5/2002 |
| JP | 2006-047411 A | | 2/2006 |
| JP | 2006-220395 | | 8/2006 |
| JP | 2008-249638 | | 10/2008 |
| JP | 2008-298627 | | 12/2008 |

OTHER PUBLICATIONS

Office Action (Notification of Reasons for Refusal) dated Feb. 8, 2011, issued in the corresponding Japanese Patent Application No. 2009-138141, and an English Translation thereof.

* cited by examiner

*Primary Examiner* — Lisa Caputo
*Assistant Examiner* — Jamel Williams
(74) *Attorney, Agent, or Firm* — Buchanan Ingersoll & Rooney PC

(57) ABSTRACT

A temperature detector has: an infrared sensor located so as not to be in contact with a measured object; an infrared transmission filter which is located between the infrared sensor and the measured object so as to block the infrared sensor from the measured object, and through which infrared rays emitted from the measured object pass; and a distance changer for changing a distance between the measured object and the infrared transmission filter, wherein the infrared sensor is provided so as to detect the infrared rays, which have passed through the infrared transmission filter, to detect a temperature of the measured object even when the distance is changed by the distance changer.

15 Claims, 4 Drawing Sheets

TEMPERATURE DETECTOR, IMAGE FORMING DEVICE HAVING TEMPERATURE DETECTOR, AND CONTAMINATION DETECTION METHOD FOR TEMPERATURE DETECTOR

This application is based on application No. 2009-138141 filed in Japan, the contents of which are hereby incorporated by reference.

BACKGROUND OF THE INVENTION

1. Field of the Invention

The present invention relates to: a temperature detector; an image forming device having the temperature detector; and a contamination detection method for the temperature detector.

2. Description of the Related Art

In a fuser of an image forming device, an infrared sensor has conventionally been used to detect a temperature of a fusing roller, but the infrared sensor has been contaminated by paper dust, toner and the like inside the image forming device, which has resulted in an error in temperature detection carried out by the infrared sensor. Therefore, as a solution to this problem, a means for detecting the degree of contamination of an infrared sensor has been proposed. For example, Japanese Unexamined Patent Application Publication No. 2001-34109 discloses a means by which a thermistor that performs temperature compensation on an infrared sensor for detection of a temperature of a fusing roller is provided, thus detecting contamination of the infrared sensor from an output change in the thermistor. Further, Japanese Unexamined Patent Application Publication No. 2006-47411 discloses a means for detecting contamination of an infrared sensor using a heating roller of a fuser by making a comparison between a temperature rise speed of the heating roller, determined in advance and used as the reference, and a temperature rise speed of the heating roller detected by the infrared sensor.

However, in the foregoing means, the degree contamination of an infrared sensor is detected based on the assumption that the infrared sensor is contaminated.

SUMMARY OF THE INVENTION

A first invention of the present application provides a temperature detector having: an infrared sensor located so as not to be in contact with a measured object; an infrared transmission filter which is located between the infrared sensor and the measured object so as to block the infrared sensor from the measured object, and through which infrared rays emitted from the measured object pass; and distance changer for changing a distance between the measured object and the infrared transmission filter, wherein the infrared sensor is provided so as to detect the infrared rays, which have passed through the infrared transmission filter, to detect a temperature of the measured object even when the distance is changed by the distance changer.

A second invention of the present application provides a method for detecting contamination of a temperature detector having an infrared sensor located so as not to be in contact with a measured object, and an infrared transmission filter which is located between the infrared sensor and the measured object so as to block the infrared sensor from the measured object, and through which infrared rays emitted from the measured object pass, wherein the method has the steps of: detecting the infrared rays, which have passed through the infrared transmission filter, by the infrared sensor when the distance between the measured object and the infrared transmission filter is a first distance, thereby detecting a first temperature of the measured object; detecting the infrared rays, which have passed through the infrared transmission filter, by the infrared sensor when the distance between the measured object and the infrared transmission filter is a second distance greater than the first distance, thereby detecting a second temperature of the measured object; and determining the degree of contamination of the infrared transmission filter such that the greater the difference between the first temperature and the second temperature, the greater the determined degree of contamination of the infrared transmission filter.

DETAILED DESCRIPTION OF THE INVENTION

Figure 1:
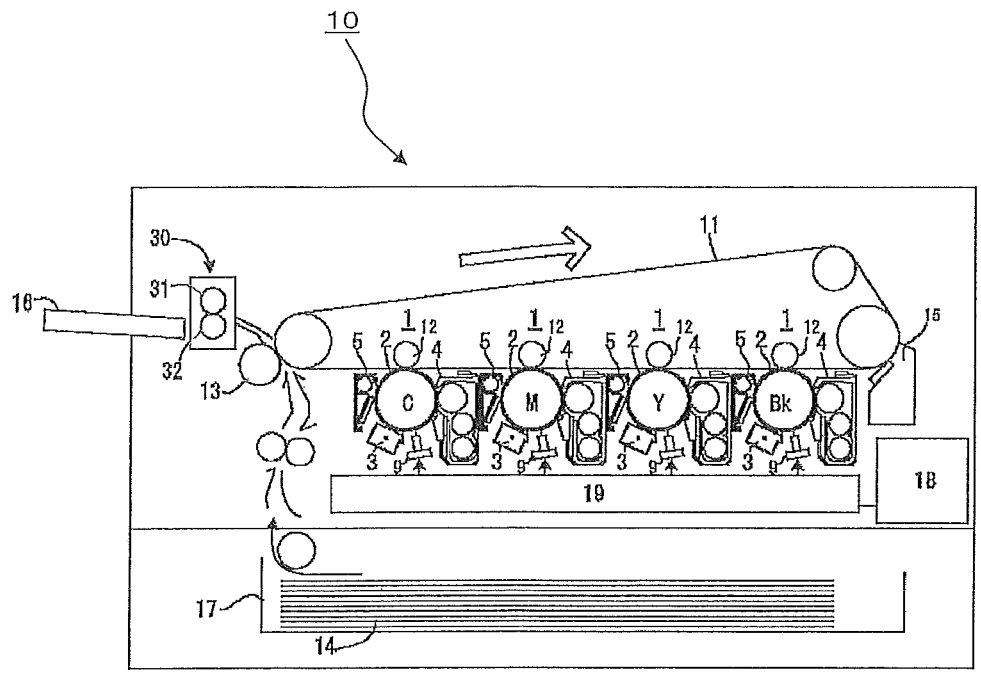
FIG. 1 is a schematic cross-sectional view illustrating an image forming device 10 having a temperature detector according to the present invention.

FIG. 1 is a cross-sectional view illustrating a schematic structure of an image forming device (or more specifically a color printer) having a temperature detector according to the present invention. Hereinafter, the present invention will be described using this image forming device as an example, but the application of the present invention is not limited to image forming devices.

An image forming device 10 has the following principal components: image forming units 1; an intermediate transfer belt 11 on which a toner image formed by the image forming unit 1 is transferred; a secondary transfer means 13 for transferring the toner image on the intermediate transfer belt 11 to a recording sheet 14 such as paper; a fuser 30 for fusing the toner image transferred to the recording sheet 14; and a controller 18 for controlling the entire image forming device 10.

In the image forming device 10 (in the case of a color printer), the image forming units 1 of respective colors for forming toner images of black (Bk), yellow (Y), magenta (M) and cyan (C) are arranged along the intermediate transfer belt 11, circulating in a direction indicated by a big arrow, in the following order from the upstream side: Bk→Y→M→C. The toner image developed on a photoconductor drum 2 of the image forming unit 1 is transferred onto the intermediate transfer belt 11 by a primary transfer means 12 at a contact position between the photoconductor drum 2 and the intermediate transfer belt 11. As for the toner image transferred onto the intermediate transfer belt 11, a toner image of each color is superposed on the intermediate transfer belt 11 every time the intermediate transfer belt 11 passes through each image forming unit 1, and a full color toner image is eventually formed on the intermediate transfer belt 11. Subsequently, at a further downstream position, the full color toner image on the intermediate transfer belt 11 is collectively transferred onto the recording sheet 14 such as paper by the so-called secondary transfer means 13. Then, the recording sheet 14 passes through the fuser 30 located at a higher position, thereby fusing the toner image onto the recording sheet 14. Thereafter, the recording sheet 14 is discharged onto a paper discharge tray 16. The recording sheets 14 are contained in a recording sheet cassette 17 located at a lowermost position, and are conveyed one by one to the secondary transfer means 13 from the recording sheet cassette 17. Toner remaining on the intermediate transfer belt 11 after secondary transfer is removed from above the intermediate transfer belt 11 by a cleaning blade 15, conveyed via a conveyance screw (not illustrated), and collected into a waste toner container (not illustrated).

Toner image formation of the image forming unit 1 will be described in detail below. Each image forming unit 1 has: the photoconductor drum 2; a charging means 3; a developing means 4; a cleaning means 5; an exposure means 9; and the primary transfer means 12.

First, the charging means 3 electrically charges the photoconductor drum 2. Next, the controller 18 transmits, to an exposure control part 19, a signal responsive to an image to be formed. The exposure control part 19 drives the exposure means 9 of the image forming unit 1 of the associated color. Then, the exposure means 9 performs image exposure on the electrically charged photoconductor drum 2, thereby forming an electrostatic latent image thereon. Next, the developing means 4 develops, using toner, the electrostatic latent image formed on the photoconductor drum 2. Then, the developed toner image is formed on the photoconductor drum 2. The developed toner image is primarily transferred onto the intermediate transfer belt 11 by the primary transfer means 12. After the primary transfer, the toner remaining on the photoconductor drum 2 is removed by the cleaning means 5 located downstream thereof, and is collected from the lower side of the cleaning means 5.

Figure 2:
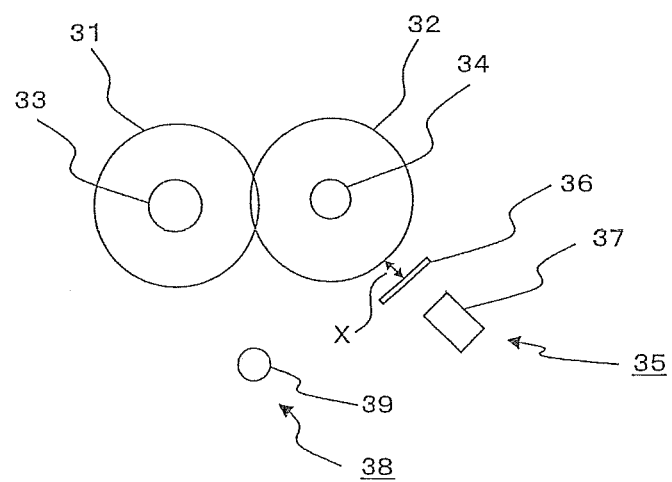
FIG. 2 is a schematic diagram illustrating a fuser of the image forming device when a heating roller 31 and a pressure roller 32 are in a pressed state.

A temperature detector according to the present invention is provided in order to detect a temperature of the fuser 30 of the image forming device 10, for example. A schematic diagram of the fuser 30 is illustrated in FIG. 2.

The fuser 30 has: a heating roller 31; a pressure roller 32; a heating roller heater 33 for heating the heating roller 31; a pressure roller heater 34 for heating the pressure roller 32; and a, temperature detector 35.

Examples of rollers usable as the heating roller 31 include one in which an iron hollow cored bar having an outer diameter of about 25 mm, a longitudinal length of about 330 mm and a thickness of about 0.8 mm is provided, silicone rubber having a thickness of about 0.2 mm is provided on a surface of the cored bar, and a PTFE tube having a thickness of about 30 μm is further provided on a surface of this rubber.

Examples of rollers usable as the pressure roller 32 include one in which an iron hollow cored bar having an outer diameter of about 30 mm and a thickness of about 2.5 mm is provided, rubber having a thickness of about 2.5 mm is provided on a surface of the cored bar, and PFA having a thickness of about 30 μm is further provided on a surface of this rubber.

Examples of heaters usable as the heating roller heater 33 include one having a 1180 W halogen lamp heater whose emission length is about 290 mm. Examples of heaters usable as the pressure roller heater 34 include one having a 230 W halogen lamp heater whose emission length is about 290 mm.

The temperature detector 35 has: an infrared transmission filter 36; and an infrared sensor 37. As illustrated in FIG. 2, the infrared transmission filter 36 is located so as to block the infrared sensor 37 from the pressure roller 32. Infrared rays emitted from the pressure roller 32 pass through the infrared transmission filter 36, and the infrared sensor 37 detects the infrared rays passed through the infrared transmission filter 36, thereby detecting a temperature of the pressure roller 32.

Figure 3:
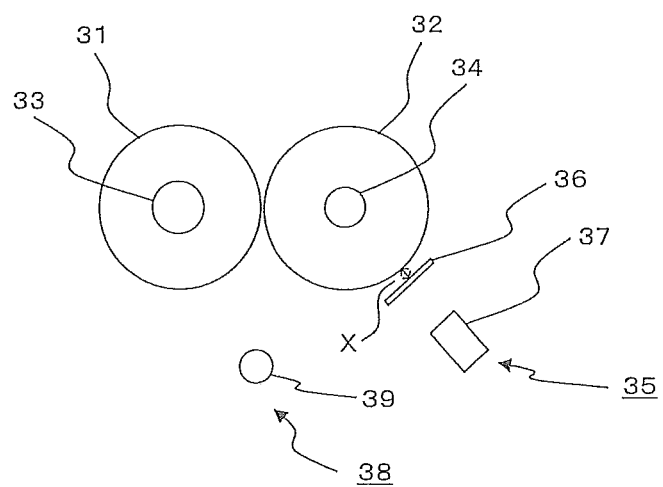
FIG. 3 is a schematic diagram illustrating the fuser of the image forming device when the heating roller 31 and the pressure roller 32 are in a separated state.

The temperature detector 35 further has a distance changer 38 for changing a distance X between the pressure roller 32 and the infrared transmission filter 36. FIG. 2 is a schematic diagram illustrating the fuser 30 of the image forming device 10 with the heating roller 31 and the pressure roller 32 pressed against each other, while FIG. 3 is a schematic diagram illustrating the fuser 30 of the image forming device 10 with the heating roller 31 and the pressure roller 32 separated from each other. The distance changer 38 has a rotation shaft 39. The rotation shaft 39 is connected to: the pressure roller 32; the pressure roller heater 34; and the infrared sensor 37, and the pressure roller 32, the pressure roller heater 34 and the infrared sensor 37 are rotated around the rotation shaft 39, thereby moving the pressure roller 32, the pressure roller heater 34 and the infrared sensor 37 in conjunction with each other. Accordingly, the pressure roller 32, the pressure roller heater 34 and the infrared sensor 37 are rotated around the rotation shaft 39, thereby allowing the pressure roller 32 to be pressed against the heating roller 31, i.e., thereby allowing the state illustrated in FIG. 3 to be changed to the state illustrated in FIG. 2. On the other hand, the pressure roller 32, the pressure roller heater 34 and the infrared sensor 37 are rotated around the rotation shaft 39 in an opposite direction, thereby allowing the pressure roller 32 to be separated from the heating roller 31, i.e., thereby allowing the state illustrated in FIG. 2 to be changed to the state illustrated in FIG. 3. In this embodiment, even when the pressure roller 32, the pressure roller heater 34 and the infrared sensor 37 are rotated around the rotation shaft 39, the heating roller 31, the heating roller heater 33 and the infrared transmission filter 36 are fixed. Therefore, during an operation for pressing/separating the pressure roller 32 against/from the heating roller 31, the distance between the pressure roller 32 and the infrared sensor 37 is kept constant, while the distance X between the pressure roller 32 and the infrared transmission filter 36 is changed. In other words, the pressure roller 32, the pressure roller heater 34 and the infrared sensor 37 are rotated around the rotation shaft 39, thereby enabling a change in the distance X.

The fuser 30 is operated as follows. In this embodiment, an operation for changing, after the start of supply of power to the fuser 30, the temperatures of surfaces of the heating roller 31 and the pressure roller 32 to temperatures (i.e., printing enable temperatures) that enable fusing of a toner image onto the recording sheet 14 will be referred to as "warming-up", and a time required for the warming-up will be referred to as a "warming-up time". This warming-up is also performed when power is turned on again, when the device is returned from a process for clearing a paper jam, when a cover is closed, or when the device is returned from a sleep mode, for example.

In the warming-up, the heating roller heater 33 and the pressure roller heater 34 are activated in order to increase the temperatures of the heating roller 31 and the pressure roller 32 to the print enable temperatures. Then, a frame that holds the pressure roller 32 is rotated around the rotation shaft 39 to apply a predetermined load so as to press the pressure roller 32 against the heating roller 31. Thereafter, a driving force is transmitted to a drive gear (not illustrated), thereby rotating the pressure roller 32 and causing the heating roller 31 to rotate so as to follow the rotation of the pressure roller 32. A linear velocity of the fuser at this time is 90 mm/s, for example. When the temperature of the heating roller 31 detected by a heating thermistor (not illustrated) and the temperature detected by the infrared sensor 37 have become predetermined printing enable temperatures, e.g., when the temperature detected by the heating thermistor has become 185° C. and the temperature detected by the infrared sensor 37 has become 135° C., the controller 18 of the image forming device 10 displays information, indicating that printing is enabled, on a display unit provided at a main body of the image forming device 10, for example. When no printing signal is inputted from outside, the image forming device 10 enters a printing standby state, and when a printing signal is inputted, the image forming device 10 starts a printing operation.

Normally, in the printing standby state, the rotation of the pressure roller 32 is stopped, and the frame that holds the pressure roller 32 is rotated around the rotation shaft 39 in the direction opposite to that when the pressure roller 32 is pressed against the heating roller 31, thus releasing the pressing of the pressure roller 32 against the heating roller 31. Then, the heating roller heater 33 and the pressure roller heater 34 are controlled so that predetermined set temperatures are reached. In other words, for example, when the set temperature of the heating roller 31 is 185° C., the ON/OFF of the heating roller heater 33 is controlled by comparing the temperature detected by the heating thermistor with 185° C. Furthermore, for example, when the set temperature of the pressure roller 32 is 150° C., the ON/OFF of the pressure roller heater 34 is controlled by comparing the temperature detected by the infrared sensor 37 with 150° C.

Figure 4:
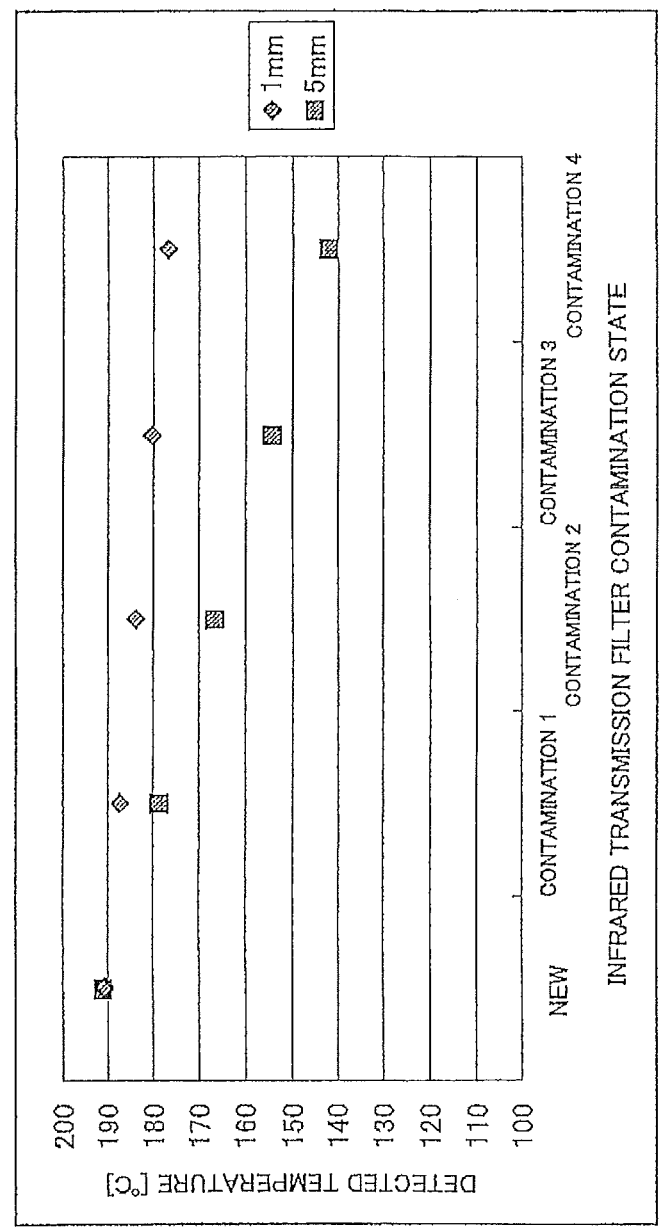
FIG. 4 is a graph illustrating a relationship between an infrared transmission filter contamination state and a detected temperature.

The temperature detector 35 further has a detection portion (not illustrated) for detecting the degree of contamination of the infrared transmission filter 36. A relationship between the degree of contamination of the infrared transmission filter 36 and a detected temperature is illustrated in FIG. 4. ♦ represents a case where the distance X between the pressure roller 32 and the infrared transmission filter 36 is 1 mm (first distance), and ■ represents a case where the distance X is 5 mm (second distance). In this embodiment, when the distance X is 1 mm, the pressure roller 32 and the heating roller 31 are separated from each other, and when the distance X is 5 mm, the pressure roller 32 is pressed against the heating roller 31. Further, as the contamination state of the infrared transmission filter 36 is changed from "CONTAMINATION 1" to "CONTAMINATION 2", "CONTAMINATION 3" and "CONTAMINATION 4", the degree of contamination of the infrared transmission filter 36 is increased.

Hereinafter, the detection of the degree of contamination of the infrared transmission filter 36 carried out by the detection portion will be described.

When the infrared transmission filter 36 is not contaminated (i.e., when the infrared transmission filter 36 is "NEW" illustrated in FIG. 4), the temperature of the pressure roller 32 detected by the infrared sensor 37 is constant irrespective of the distance X between the pressure roller 32 and the infrared transmission filter 36. This is because infrared rays emitted from the pressure roller 32 pass through the infrared transmission filter 36 irrespective of the distance X, and the infrared sensor 37 detects the temperature of the pressure roller 32 from the amount of infrared rays passed through the infrared transmission filter 36.

As the infrared transmission filter 36 is contaminated, the infrared sensor 37 will detect both of infrared rays emitted from the pressure roller 32, and infrared rays emitted from the infrared transmission filter 36. In other words, part of the infrared rays emitted from the pressure roller 32 is not allowed to pass through the infrared transmission filter 36 due to the contamination thereof, and the remaining infrared rays allowed to pass through the infrared transmission filter 36 are detected by the infrared sensor 37. Furthermore, the contaminated infrared transmission filter 36 is heated since the contamination thereof is heated, resulting in emission of infrared rays. Then, the infrared sensor 37 will also detect the infrared rays emitted from the infrared transmission filter 36.

The temperature of the infrared transmission filter 36 is lower than that of the pressure roller 32, and therefore, the infrared sensor 37 that detects infrared rays from both of them (i.e., the pressure roller 32 and the infrared transmission filter 36) will detect a lower temperature as compared with a case where the infrared sensor 37 detects infrared rays only from the pressure roller 32. Furthermore, as the degree of contamination of the infrared transmission filter 36 is increased, the proportion of the infrared rays, emitted from the infrared transmission filter 36, to the infrared rays detected by the infrared sensor 37 is increased, and the temperature detected by the infrared sensor 37 is decreased.

In this embodiment, upon increase of the distance X between the pressure roller 32 and the infrared transmission filter 36, the temperature of the infrared transmission filter 36, heated by heat transmission from the pressure roller 32, is decreased, and therefore, the amount of infrared rays from the infrared transmission filter 36 is reduced, thus decreasing the temperature detected by the infrared sensor 37.

The greater the degree of contamination of the infrared transmission filter 36, the greater the proportion of the infrared rays, emitted from the infrared transmission filter 36, to the infrared rays detected by the infrared sensor 37; in addition, the distance X between the pressure roller 32 and the infrared transmission filter 36 is increased, thereby decreasing the temperature of the infrared transmission filter 36. In other words, the greater the degree of contamination of the infrared transmission filter 36, the larger the amount of decrease in the temperature detected by the infrared sensor 37 when the distance X is increased. As a result, the degree of contamination of the infrared transmission filter 36 can be detected by changing the distance X.

The detection portion detects the degree of contamination of the infrared transmission filter 36 from the amount of decrease in the temperature detected by the infrared sensor 37 when the distance X between the pressure roller 32 and the infrared transmission filter 36 is increased. More specifically, as illustrated in FIG. 4, when the degree of contamination of the infrared transmission filter 36 is low ("CONTAMINATION 1"), the temperature detected by the infrared sensor 37 is decreased by about 10° C. upon change of the distance X from 1 mm (first distance) to 5 mm (second distance) by the distance changer 38. In this case, the detection portion detects the degree of contamination of the infrared transmission filter 36 as "CONTAMINATION 1" from the amount of decrease (about 10° C.) in the temperature detected by the infrared sensor 37. Similarly, upon decrease in the temperature detected by the infrared sensor 37 by about 15° C. when the distance X is changed from 1 mm to 5 mm, the detection portion detects the degree of contamination of the infrared transmission filter 36 as "CONTAMINATION 2" greater than "CONTAMINATION 1". Upon decrease in the temperature detected by the infrared sensor 37 by about 25° C. when the distance X is changed from 1 mm to 5 mm, the detection portion detects the degree of contamination of the infrared transmission filter 36 as "CONTAMINATION 3" greater than "CONTAMINATION 2". Upon decrease in the temperature detected by the infrared sensor 37 by about 30° C. when the distance X is changed from 1 mm to 5 mm, the detection portion detects the degree of contamination of the infrared transmission filter 36 as "CONTAMINATION 4" greater than "CONTAMINATION 3".

Specifically, the contamination of the infrared transmission filter 36 is detected by the detection portion as follows.

When the distance X between the pressure roller 32 and the infrared transmission filter 36 is changed by the distance changer 38 and the temperature of the pressure roller 32 detected by the infrared sensor 37 is not changed, the detection portion determines that the infrared transmission filter 36 is not contaminated.

When the temperature of the pressure roller 32 detected by the infrared sensor 37 is decreased upon increase of the distance X between the pressure roller 32 and the infrared transmission filter 36 by the distance changer 38, the detection portion determines that the infrared transmission filter 36 is contaminated. Moreover, the detection portion detects the degree of contamination of the infrared transmission filter 36 from the amount of decrease in the temperature of the pressure roller 32 detected by the infrared sensor 37. In this case, when the detection portion has detected a certain level of contamination (e.g., "CONTAMINATION 3") of the infrared transmission filter 36, the controller 18 may recognize an abnormality and stop the operation of the image forming device 10. Further, relationships between the degree of contamination of the infrared transmission filter 36 and the amount of decrease in the temperature detected by the infrared sensor 37 may be organized in advance so as to determine the amount of decrease in the temperature detected by the infrared sensor 37, at which the infrared transmission filter 36 should be replaced. Furthermore, based on the results of the organized relationships between the degree of contamination of the infrared transmission filter 36 and the amount of decrease in the temperature detected by the infrared sensor 37, the temperature detected by the infrared sensor 37 may be corrected so as to enable grasping of the actual temperature of the pressure roller 32.

In the temperature detector 35 of the present embodiment, the infrared transmission filter 36 is located so as to block the infrared sensor 37 from the pressure roller 32, and therefore, the infrared sensor 37 can be protected from contamination caused by paper dust, toner and the like inside the image forming device 10. As a result, the infrared transmission filter 36 will be contaminated instead of the infrared sensor 37, but an operation for replacing/cleaning the infrared transmission filter 36 can carried out more easily than an operation for replacing/cleaning the infrared sensor 37. Besides, in the present embodiment, since the temperature detector 35 has the distance changer 38, the detection portion is capable of detecting the degree of contamination of the infrared transmission filter 36 from a change in the temperature detected by the infrared sensor 37 incident to a change in the distance made by the distance changer 38. In particular, just by increasing the distance X between the pressure roller 32 and the infrared transmission filter 36 once by the distance changer 38 (i.e., it is only necessary to change the distance once), the detection portion is capable of detecting the degree of contamination of the infrared transmission filter 36. Also, since the detection portion detects the degree of contamination of the infrared transmission filter 36, whether or not an operation for replacing/cleaning the infrared transmission filter 36 is required can be easily determined.

In the present embodiment, although the rotation shaft 39 for moving the pressure roller 32 has been described by way of example as the distance changer 38 for changing the distance X between the pressure roller 32 and the infrared transmission filter 36, the distance changer of the present invention is not limited to the foregoing means but may be any other means that changes the distance X. For example, the infrared transmission filter 36 may be provided so as to be movable, thus changing the distance X. Alternatively, the distance changer may move both of the pressure roller 32 and the infrared transmission filter 36, thus changing the distance X.

In the present embodiment, the temperature detector 35 according to the present invention is provided in order to detect the temperature of the pressure roller 32, but may be provided in order to detect the temperature of the heating roller 31. Alternatively, the temperature detector 35 may be provided in order to detect the temperatures of both of the pressure roller 32 and the heating roller 31.

Figure 5:
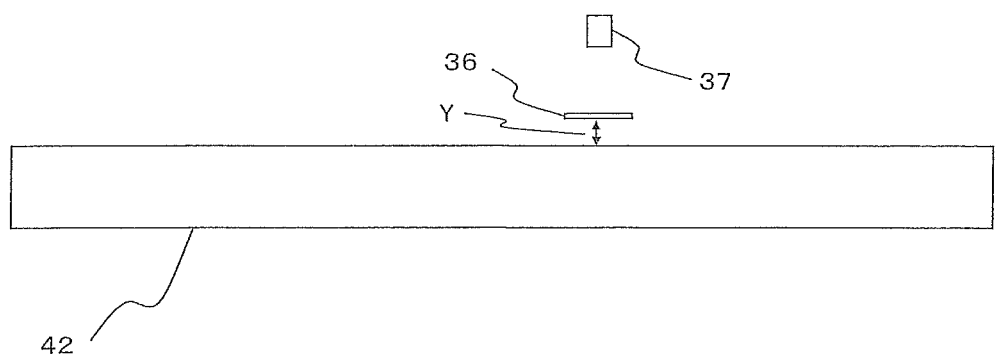
FIG. 5 is a schematic diagram illustrating another embodiment of the present invention.

It should be noted that although the temperature detector according to the present invention has been described as a temperature detector for a fuser of an image forming device, the temperature detector of the present invention may also be applicable as a temperature detector for a device other than a fuser or an image forming device. For example, the temperature detector of the present invention may also be applicable to a device illustrated in FIG. 5. Specifically, in FIG. 5, an infrared sensor 37 is provided at a distance from a measured object 42 on a plane, and an infrared transmission filter 36 is provided between the measured object 42 and the infrared sensor 37 so as to block the infrared sensor 37 from the measured object 42. Furthermore, in FIG. 5, the infrared sensor 37 detects, via the infrared transmission filter 36, infrared rays emitted from the measured object 42, and the infrared transmission filter 36 is movable so that a distance Y between the measured object 42 and the infrared transmission filter 36 is changeable.

Thus, the present invention is capable of achieving the following effects.

A first invention of the present application provides a temperature detector having: an infrared sensor located so as not to be in contact with a measured object; an infrared transmission filter which is located between the infrared sensor and the measured object so as to block the infrared sensor from the measured object, and through which infrared rays emitted from the measured object pass; and a distance changer for changing a distance between the measured object and the infrared transmission filter, wherein the infrared sensor is provided so as to detect the infrared rays, which have passed through the infrared transmission filter, to detect a temperature of the measured object even when the distance is changed by the distance changer.

In the above-described constitution, the contamination of the infrared sensor is prevented by the infrared transmission filter, and therefore, the contamination of the infrared sensor can be prevented with the simple constitution. Moreover, even when the distance between the infrared transmission filter and the measured object is changed by the distance changer, the infrared sensor is capable of detecting the temperature of the measured object. In other words, the detected temperatures prior to and subsequent to the change in the distance between the infrared transmission filter and the measured object are obtained. Further, from this detected temperature change, the degree of contamination of the infrared transmission filter can be detected.

The first invention of the present application preferably further has the following constitution.

(1) The temperature detector further has a detection portion for detecting the degree of contamination of the infrared transmission filter, and the detection portion obtains a change in the detected temperature of the measured object incident to a change in the distance, thereby detecting the degree of contamination of the infrared transmission filter.

(2) The distance changer changes the distance from a first distance to a second distance greater than the first distance, and the infrared sensor detects a first temperature of the measured object when the distance is the first distance, and detects a second temperature of the measured object when the distance is the second distance.

(3) In the foregoing constitution (1), the distance changer changes the distance from a first distance to a second distance greater than the first distance, the infrared sensor detects a first temperature of the measured object when the distance is the first distance, and detects a second temperature of the measured object when the distance is the second distance, and the greater the difference between the first temperature and the second temperature; the greater the degree of the contamination indicated by the detection portion.

In the foregoing constitution (1), the detection portion detects the degree of contamination of the infrared transmission filter from the change in the temperature of the measured object detected by the infrared sensor when the distance between the measured object and the infrared transmission filter is changed, and therefore, the detection of the degree of contamination of the infrared transmission filter is enabled with the simple constitution.

In the constitutions (2) and (3), the degree of contamination of the infrared transmission filter can be detected just by changing the distance between the measured object and the infrared transmission filter once, and therefore, the degree of contamination of the infrared transmission filter can be detected more easily.

Another invention of the present application provides an image forming device having a fuser that has the temperature detector according to the first invention of the present application.

In the above-described constitution, the contamination of the infrared sensor for detecting the temperature of the fuser can be prevented by the infrared transmission filter. Besides, the contamination of the infrared transmission filter can be easily detected from a change in the detected temperature of the fuser, which is caused by a change in the distance between the infrared transmission filter and the fuser.

To sum up, the present invention can provide the temperature detector capable of preventing the contamination of the infrared sensor with a simple constitution and capable of detecting the contamination of the infrared transmission filter that prevents the contamination of the infrared sensor.

What is claimed is:

1. A temperature detector having:
an infrared sensor located so as not to be in contact with a measured object;
an infrared transmission filter which is located between the infrared sensor and the measured object so as to block the infrared sensor from the measured object, and through which infrared rays emitted from the measured object pass; and
a distance changer for changing a distance between the measured object and the infrared transmission filter, wherein the infrared sensor is provided so as to detect the infrared rays, which have passed through the infrared transmission filter, to detect a temperature of the measured object even when the distance is changed by the distance changer.

2. The temperature detector according to claim 1, further comprising a detection portion for detecting a degree of contamination of the infrared transmission filter, and
wherein the detection portion obtains a change in the detected temperature of the measured object incident to a change in the distance, thereby detecting the degree of contamination of the infrared transmission filter.

3. The temperature detector according to claim 1,
wherein the distance changer changes the distance from a first distance to a second distance greater than the first distance, and
wherein the infrared sensor detects a first temperature of the measured object when the distance is the first distance, and detects a second temperature of the measured object when the distance is the second distance.

4. The temperature detector according to claim 2,
wherein the distance changer changes the distance from a first distance to a second distance greater than the first distance,
wherein the infrared sensor detects a first temperature of the measured object when the distance is the first distance, and detects a second temperature of the measured object when the distance is the second distance, and
wherein the greater the difference between the first temperature and the second temperature, the greater the degree of the contamination indicated by the detection portion.

5. The temperature detector according to claim 4,
wherein the lower the second temperature with respect to the first temperature, the greater the difference between the first temperature and the second temperature detected by the detection portion.

6. An image forming device having a fuser that has the temperature detector according to claim 1.

7. An image forming device having a fuser that has the temperature detector according to claim 2.

8. An image forming device having a fuser that has the temperature detector according to claim 3.

9. An image forming device having a fuser that has the temperature detector according to claim 4.

10. An image forming device having a fuser that has the temperature detector according to claim 5.

11. The image forming device according to claim 6,
wherein the fuser has a heating roller and a pressure roller, and
wherein the measured object is the heating roller or the pressure roller.

12. The image forming device according to claim 11,
wherein the heating roller and the pressure roller are changeable between: a pressed state in which the rollers are pressed against each other; and a separated state in which the rollers are separated from each other, and
wherein the heating roller and the pressure roller are changed between the pressed state and the separated state, thereby changing the distance between the measured object and the infrared transmission filter.

13. The image forming device according to claim 12,
wherein the distance between the measured object and the infrared sensor is constant in the pressed state and in the separated state.

14. A method for detecting contamination of a temperature detector which has an infrared sensor located so as not to be in contact with a measured object, and an infrared transmission filter which is located between the infrared sensor and the measured object so as to block the infrared sensor from the measured object, and through which infrared rays emitted from the measured object pass, the method comprising the steps of:
detecting the infrared rays, which have passed through the infrared transmission filter, by the infrared sensor when the distance between the measured object and the infrared transmission filter is a first distance, thereby detecting a first temperature of the measured object;

detecting the infrared rays, which have passed through the infrared transmission filter, by the infrared sensor when the distance between the measured object and the infrared transmission filter is a second distance greater than the first distance, thereby detecting a second temperature of the measured object; and determining the degree of contamination of the infrared transmission filter such that the greater the difference between the first temperature and the second temperature, the greater the determined degree of contamination of the infrared transmission filter.

15. The temperature detector contamination detection method according to claim 14, wherein in the step of determining the degree of contamination of the infrared transmission filter, the lower the second temperature with respect to the first temperature, the greater the determined difference between the first temperature and the second temperature.

\* \* \* \* \*